(12) United States Patent
Frederick

(10) Patent No.: US 12,351,264 B2
(45) Date of Patent: Jul. 8, 2025

(54) SYSTEM FOR CREATING DOWNFORCE ON A WHEELED VEHICLE

(71) Applicant: Frederick & Cederna Architects LLC, Potomac, MD (US)

(72) Inventor: Douglas Frederick, Potomac, MD (US)

(73) Assignee: Frederick & Cederna Architects LLC, Potomac, MD (US)

( * ) Notice: Subject to any disclaimer, the term of this patent is extended or adjusted under 35 U.S.C. 154(b) by 0 days.

(21) Appl. No.: 18/755,177

(22) Filed: Jun. 26, 2024

(65) Prior Publication Data

US 2025/0002105 A1  Jan. 2, 2025

Related U.S. Application Data

(60) Provisional application No. 63/523,739, filed on Jun. 28, 2023.

(51) Int. Cl.
*B62J 17/00* (2020.01)
*B62D 35/00* (2006.01)

(52) U.S. Cl.
CPC ............ *B62J 17/00* (2013.01); *B62D 35/005* (2013.01); *B62D 35/007* (2013.01)

(58) Field of Classification Search
CPC ....... B62J 17/00; B62D 35/005; B62D 35/007
See application file for complete search history.

(56) References Cited

U.S. PATENT DOCUMENTS 2,401,245 A * 5/1946 Hobbs ...................... B62J 17/00
296/78.1
4,779,915 A 10/1988 Straight
4,813,583 A 3/1989 Carpenter
4,822,067 A 4/1989 Matsuo et al.
5,544,434 A 8/1996 Calvachio, Jr.
(Continued)

FOREIGN PATENT DOCUMENTS

EP       3546328 A1 * 10/2019 .............. B62J 17/00
GB        581403 A  * 10/1946
WO   WO-2022162572 A1 *  8/2022 .............. B62J 17/02

OTHER PUBLICATIONS

JP 6683540 B2 with English translation (Year: 2020).*
(Continued)

*Primary Examiner* — Lori Lyjak
(74) *Attorney, Agent, or Firm* — Harness, Dickey & Pierce, P.L.C.

(57) ABSTRACT

A vehicle includes a frame configured to pivot relative to a support surface through both positive and negative roll angles and a wheel support coupled to the frame. The wheel support includes an axle mounting portion. An axle defining an axis of rotation is mounted to the wheel support at the axle mounting portion. A downforce generating system is mounted to the wheel support between the frame and the axle mounting portion. The downforce generating system includes a wing support mounted to the wheel support and a downforce generating wing pivotally mounted to the wing support. The downforce generating wing includes an aerodynamic surface having a leading edge. The downforce generating system is configured to maintain a substantially horizontal orientation of the leading edge relative to the support surface as the frame pivots between the positive and the negative roll angles.

20 Claims, 6 Drawing Sheets

(56) References Cited

U.S. PATENT DOCUMENTS

| | | | |
|---|---|---|---|
| 7,178,858 B1 | 2/2007 | Hesse | |
| 2003/0201289 A1* | 10/2003 | Swain | B60R 9/06 |
| | | | 224/500 |
| 2023/0013593 A1* | 1/2023 | Yaffe | B62K 19/00 |

OTHER PUBLICATIONS

International Search Report and Written Opinion of the International Searching Authority regarding International Patent Application No. PCT/US2024/035726, dated Oct. 10, 2024.

* cited by examiner

SYSTEM FOR CREATING DOWNFORCE ON A WHEELED VEHICLE

CROSS-REFERENCE TO RELATED APPLICATIONS

This application claims the benefit of U.S. Provisional Application No. 63/523,739 filed on Jun. 28, 2023. The entire disclosure of the above application is incorporated herein by reference.

FIELD

The present disclosure relates to the art of wheeled vehicles and, more particularly, to a system for providing downforce to a wheeled vehicle.

BACKGROUND

When exposed to acceleration forces, motorcycles or two-wheeled vehicles tend to rotate upwards about a rear axle (also known as a wheelie). Acceleration forces delivered through rear wheels tend to cause front wheels to lift as torque generated by a power unit exceeds the weight of the front of the vehicle. Downforce (downward force), which can be applied to counteract this lift is generated by vehicle body shape as well as force created by wings or spoilers mounted to the vehicle. Vehicles transition between multiple forces when moving. For example, a vehicle experiences different forces during acceleration, during braking, and when turning or cornering. Downforce can improve tractin, grip, and road adhesion in any of these circumstances.

Motorcycles include multiple surfaces that contribute to generating downward force and improving aerodynamics. For example, gas tanks are shaped to reduce drag, engines are covered or shielded by fairings that reduce drag and enhance downward forces, and winglets may be added to further improve downward forces. In addition, a rider's body position contributes to motorcycle aerodynamics and downward force generation.

Downward force increases contact patch and grip with road surfaces at front and/or rear tires during acceleration, braking, and turning. Maintaining a positive contact and grip between vehicle wheels and tires and road surfaces increases driving performance and rider safety. Accordingly, it would be desirable to provide a system for increasing downward force on a vehicle, particularly a motorcycle during each stage of driving (acceleration, braking, and turning).

SUMMARY

This section provides a general summary of the disclosure and is not a comprehensive disclosure of its full scope or all of its features.

A vehicle, in accordance with the present disclosure, includes a frame configured to pivot relative to a support surface through both positive and negative roll angles and a wheel support coupled to the frame. The wheel support includes an axle mounting portion. An axle defining an axis of rotation is mounted to the wheel support at the axle mounting portion. A downforce generating system is mounted to the wheel support between the frame and the axle mounting portion. The downforce generating system includes a wing support mounted to the wheel support and a downforce generating wing pivotally mounted to the wing support. The downforce generating wing includes an aerodynamic surface having a leading edge. The downforce generating system is configured to maintain a substantially horizontal orientation of the leading edge relative to the support surface as the frame pivots between the positive and the negative roll angles.

In other features the wing support is mounted to the wheel support at the axle mounting portion.

In other features a rotational motor is mounted to the wing support and connected to the downforce generating wing. The rotational motor defining a rotational axis for the downforce generating wing.

In other features the rotational motor is coupled to a motor support connected to the wing support through a hinge, the hinge defining a pivot axis for the downforce generating wing.

In other features a wing controller operatively connected to the rotational motor, the wing controller being operable to selectively rotate the downforce generating wing to maintain a substantially constant horizontal orientation of the downforce generating wing relative to the support surface.

In other features at least one of a lean angle sensor, a throttle sensor, and a brake pressure sensor, the wing controller being operable to selectively activate the rotational motor to maintain the substantially constant horizontal orientation of the downforce generating wing relative to the support surface based on inputs from the one of the lean angle sensor, the throttle sensor, and the brake pressure sensor.

In other features a motor support is connected to the wing support; and a hinge connects the motor support to the wing support, the hinge defining a pivot axis for the downforce generating wing, wherein the rotational motor is coupled to the motor support.

In other features a linear actuator is mounted to one of the motor support and the wing support, the linear actuator being connected to the wing controller.

In other features the wing controller is selectively operable to control the linear actuator to selectively shift the downforce generating wing about the pivot axis.

In other features the downforce generating wing is positioned between the support surface and the axle mounting portion.

In other features a suspension component is arranged between the frame and the wheel support.

In other features the wheel support comprises one or a front fork component and a swingarm.

A downforce generating system mountable to a wheel support between a frame and an axle mounting portion of a two wheeled vehicle in accordance with the present disclosure includes a wing support, and a downforce generating wing pivotally mounted to the wing support, the downforce generating wing including an aerodynamic surface having a leading edge. The downforce generating system maintains a substantially horizontal orientation of the leading edge relative to a support surface as the frame pivots between the positive and the negative roll angles.

In other features the suspension component comprises each of a front fork component and a swingarm.

A method of creating downforce on a wheel of a vehicle in accordance with the present disclosure includes detecting an orientation parameter of the vehicle, activating a rotational motor connected to a downforce generating wing mounted to a wheel support, rotating the downforce generating wing about a pivot axis defined by the rotational motor, and maintaining a substantially horizontal orientation of the downforce generating wing relative to a support surface with the rotational motor through changes in roll angle.

In other features detecting changes in orientation includes sensing changes in vehicle roll angle, the substantially horizontal orientation of the downforce generating wing being maintained through the changes in vehicle roll angle.

In other features maintaining the substantially horizontal orientation of the downforce generating wing includes providing signals from one of a lean angle sensor, a throttle sensor, and a brake sensor to a downforce generating wing controller.

In other features the downforce generating wing is pivoted about a pivot axis that is substantially perpendicular relative to the pivot axis.

In other features maintaining the substantially horizontal orientation of the downforce generating wing includes generating a substantially constant downward force on the wheel support, the substantially constant downward force being directed along a downward force axis that is substantially perpendicular relative to the support surface.

In other features generating the substantially constant downward force on the wheel support includes applying the generating a substantially constant downward force on an un-sprung portion of the wheel support.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
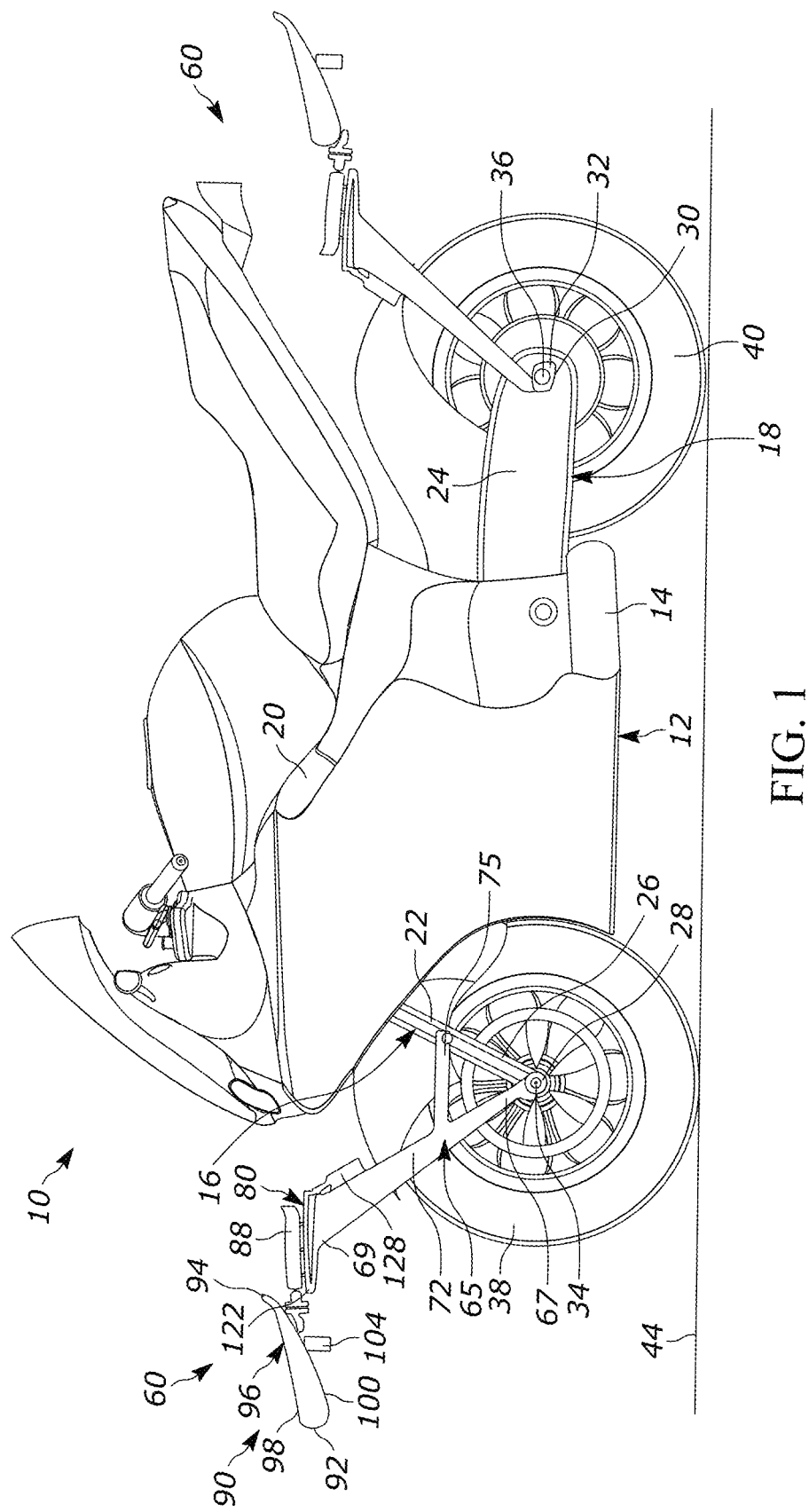
FIG. 1 is a left side view of a motorcycle including an active system for providing downforce including a first downforce generating wing mounted to a front wheel support and a second downforce generating wing mounted to a rear wheel support, in accordance with a non-limiting example.
Figure 2:
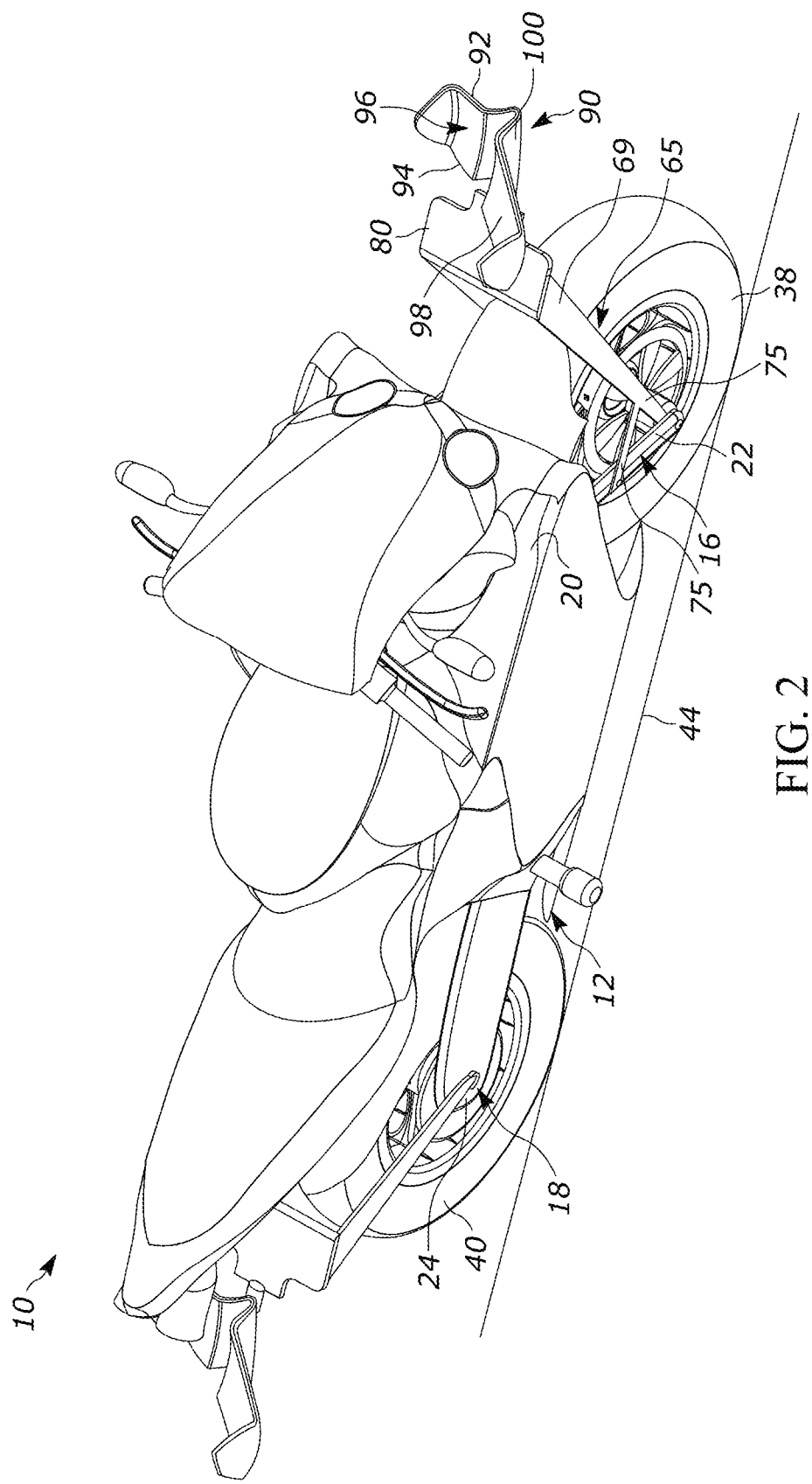
FIG. 2 depicts the motorcycle of FIG. 1 in a leaning configuration depicting the first and second downforce generating wings maintaining a substantially horizontal orientation relative to a road surface, in accordance with a non-limiting example.

A vehicle, in accordance with a non-limiting example, is indicated generally at 10 in FIGS. 1 and 2. Vehicle 10 is shown in the form of a motorcycle 12 having a frame 14, a front wheel support 16, a rear wheel support 18, and a motor 20. Motor 20 may take on a variety of forms including internal combustion engines, electric motors, as well as hybrid motors that include aspects of internal combustion engines and electric motors. At this point, it should be understood that the term frame may encompass a tubular frame, a chassis, or other form of support structure.

In one non-limiting example, front wheel support 16 takes the form of a front fork 22 and rear wheel support 18 takes the form of a rear swingarm 24. Front fork 22 includes a front axle support member 26 having a front axle mounting portion 28 and rear swingarm 24 includes a rear axle support member 30 including a rear axle mounting portion 32. Front axle mounting portion 28 receives a front axle 34 and rear axle mounting portion 32 receives a rear axle 36. A front wheel and tire 38 is rotationally coupled to front axle support member 26 through front axle 34. Likewise, a rear wheel and tire 40 is coupled to rear axle support member 30 through rear axle 36. Front wheel and tire 38 and rear wheel and tire 40 rest and/or ride upon a road or support surface 44.

Figure 3:
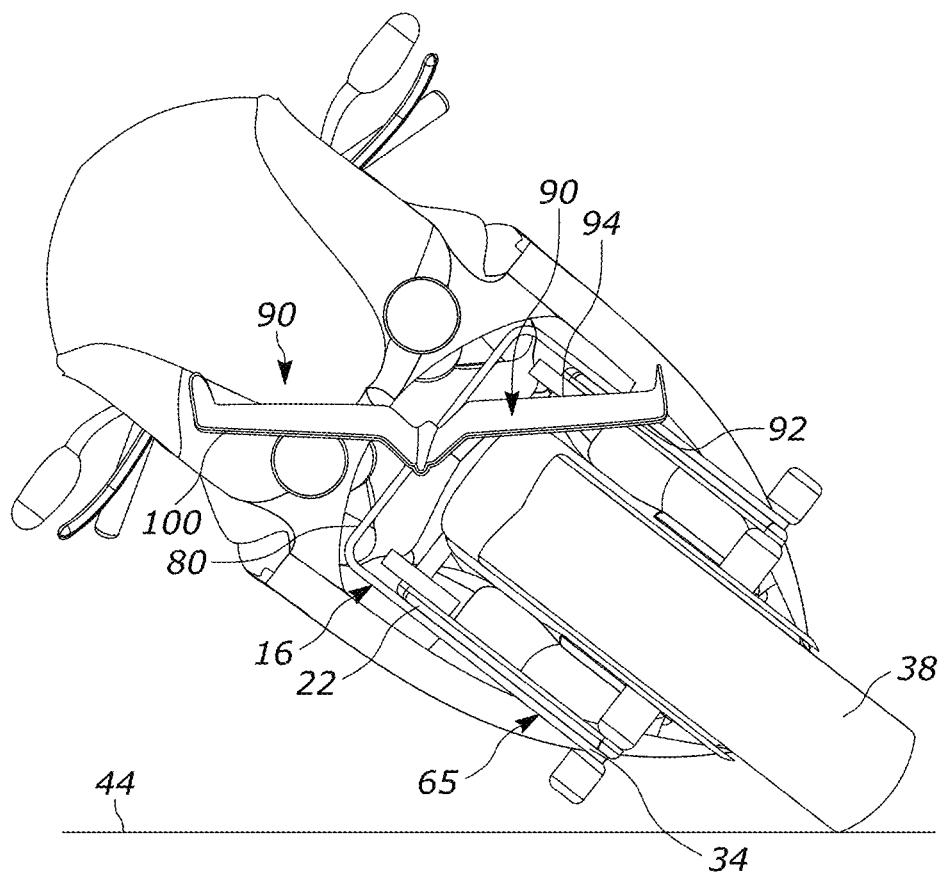
FIG. 3 is a front view of the motorcycle of FIG. 2, in accordance with a non-limiting example.

In a non-limiting example, motorcycle 12 includes a downforce generating system 60 mounted to front axle support member 26 and rear axle support member 30. Downforce generating system 60 enhances contact between front wheel and tire 38/rear wheel and tire 40 and support surface 42 particularly during vehicle accelerations and turning. When turning, motorcycle 12 may experience roll angles between about +28° and about −28° from support surface 44 such as shown in FIGS. 2 and 3.

To enhance traction, downforce generating system 60 acts on unsprung components of motorcycle 12. That is, none of the forces generated by downforce generating system 60 are absorbed by vehicle suspension components that may be arranged in front fork 22 or connected with rear swingarm 24. The downforce is passed directly through front wheel and tire 38 and rear wheel and tire 40 into support surface 44. As will be detailed herein, the force(s) generated by downforce generating system 60 is maintained along an axis that is substantially perpendicular to support surface 44 regardless of the orientation (roll angle) of motorcycle 12.

Reference will continue to FIG. 1 in describing downforce generating system 60 associated with front wheel support 16 (two front fork suspension units) with an understanding that rear wheel support 18 may include similar structure. Downforce generating system 60 includes a wing support 65 connected to front wheel support 16. Wing support 65 includes a first end 67 mounted at front axle mounting portion 28, a second end 69, and an intermediate portion 72. A support strut 75 joins intermediate portion 72 and front axle support member 26. Second end 69 of wing support 65 is cantilevered and extends above and slightly forward of front wheel and tire 38.

In a non-limiting example, a motor support 80 is connected to wing support 65 at second end 69. A rotational motor 88 is mounted to motor support 80. Rotational motor 88 includes an output shaft (not separately labeled) that defines an axis of rotation. In one non-limiting example, the axis of rotation may extend 70°. In another non-limiting example, the axis of rotation may be less than 70°. A downforce generating wing 90 is connected to the output shaft of rotational motor 88. As will be detailed more fully herein, rotational motor 88 pivots downforce generating wing 90 about the rotational axis in order to maintain a substantially perpendicular downward force vector regardless of motorcycle orientation.

In a non-limiting example, downforce generating wing 90 includes a leading edge 92, a trailing edge 94, and an aerodynamic surface 96 that is defined between leading edge 92 and trailing edge 94. Aerodynamic surface 96 includes an upper surface portion 98 and a lower surface portion 100. In a non-limiting example, a wing angle sensor 104 may be mounted to lower surface portion 100. It should however be noted that the particular mounting location of wing angle sensor 104 may vary.

In a non-limiting example, motor support 80 is connected to second end 69 of wing support 65 through a hinge 122. Hinge 122 defines a pivot axis for rotational motor 88 and, by extension, downforce generating wing 90. With this arrangement, downforce generating wing is not only selectively rotated about the rotational axis but also pivoted about the pivot axis to ensure that the downward force vector remains substantially perpendicular relative to support surface 42 regardless of motorcycle orientation.

In a non-limiting example, a linear actuator 128 may be mounted to intermediate portion 72 of wing support 65 at second end 69 and operatively connected with motor support 80. Linear actuator 128, as will be detailed more fully herein may, in the alternative, be mounted to motor support 80 and operatively connected with wing support 65. Linear actuator 128 is selectively activated to adjust the front-to-back angle of downforce generating wing 90 to ensure that the downward force vector remains substantially perpendicular relative to support surface 42 regardless of motorcycle orientation.

Figure 4:
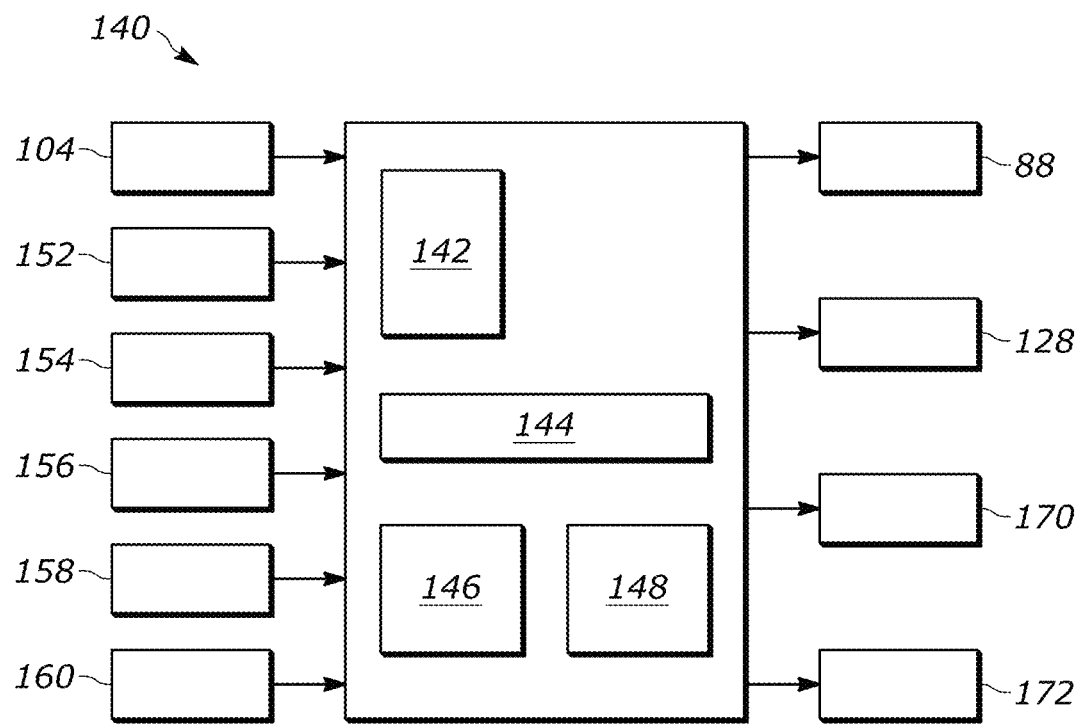
FIG. 4 is a block diagram depicting a system for manipulating the first and second downforce generating wings to increase downforce on the motorcycle, in accordance with a non-limiting example.

In a non-limiting example, rotational motor 88 and linear actuator 128 are connected to a wing controller 140 as shown in FIG. 4. Wing controller 140 includes a central processor unit (CPU) 142, a non-volatile memory 144, a rotational motor controller 146 and a linear actuator controller 148. At this point, while shown as separate components co-located on a single element, components may be combined with each other and/or with other vehicle systems.

Wing controller 140 may receive inputs from one or more of wing angle sensor 104, a lean angle sensor 152, a throttle sensor 154, a front brake sensor 156, a rear brake sensor 158, and a gyroscope 160. Wing controller 140 may also receive inputs from a front speed wheel sensor and a rear wheel speed sensor (not separately labeled) that are mounted at corresponding ones of front axle 34 and rear axle 36. Wing controller 140 may further be connected with a rear rotational motor 170 and a rear linear actuator 172 that form part of the downward force generation system associated with a rear downforce generating wing 177 arranged on rear wheel support 18.

Figure 5:
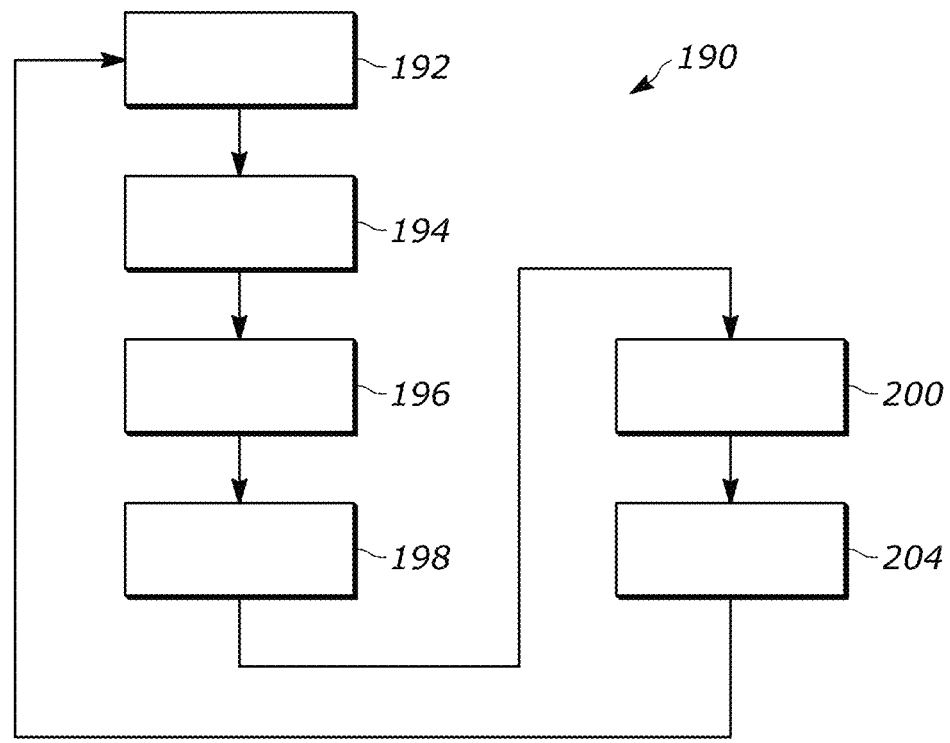
FIG. 5 is a flow chart depicting a method of sensing vehicle orientation and manipulating the first and second downforce generating wings, in accordance with a non-limiting example.

Reference will now follow to FIG. 5 in describing a method 190 of applying downforce to unsprung portions of a vehicle. Wing controller 140 begins to receive signals from, for example, throttle sensor 154 in block 192, from lean angle sensor 152 in block 194, and from front brake sensor 156 and rear brake sensor 158 in block 196. At this point, it should be understood that the particular order in which data is received from throttle sensor 154, lean angle sensor 152, front brake sensor 156, and rear brake sensor 158 may vary. Based on the data received, rotational motor controller 146, relying on instructions stored in non-volatile memory 144, will signal rotational motor 88 to adjust a rotational angle of downforce generating wing 90 in block 198. Similarly, rear rotational motor 170 may be signaled to adjust rear downforce generating wing 177.

In block 200, data from gyroscope 160 may be sent to wing controller 140. Data from gyroscope 160 is passed to linear actuator controller 148 and processed, based on instructions stored in non-volatile memory 144 to generate a pivot position signal that is passed to linear actuator 128. Linear actuator may then act upon wing support 65 to pivot downforce generating wing 90 about the pivot axis in block 204. Similar control may be applied to rear downforce generating wing 177 through rear linear actuator 172.

At this point, it should be understood that wing controller 140 adjusts, in real time, the position of downforce generating wing 90 and, if provided, rear downforce generating wing 177 to impart forces on front axle support member 26 and rear axle support member 30 to enhance traction components for front wheel and tire 38 and rear wheel and tire 40. By directing the energy through unsprung components of the vehicle, the downward force is applied with minimal losses. Further, by maintaining the downward force along a vector that is substantially perpendicular to the supporting surface, vehicle traction and, by extension, vehicle performance may be enhanced.

Figure 6:
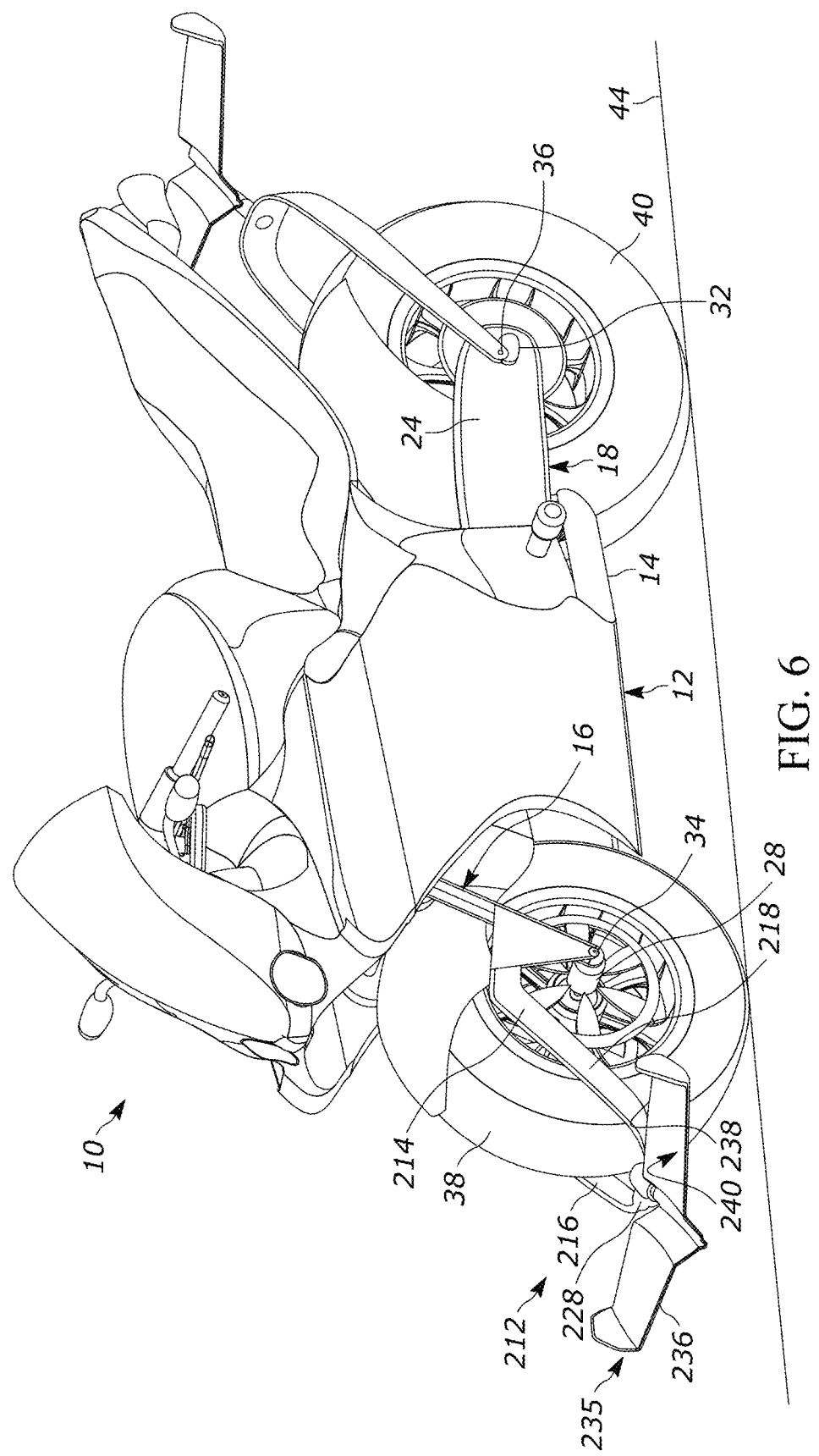
FIG. 6 is a front left view of a wheeled vehicle in the form of a motorcycle in an upright position including a passive downward force generating system having a downforce generating front wing, in accordance with a non-limiting example.
Figure 7:
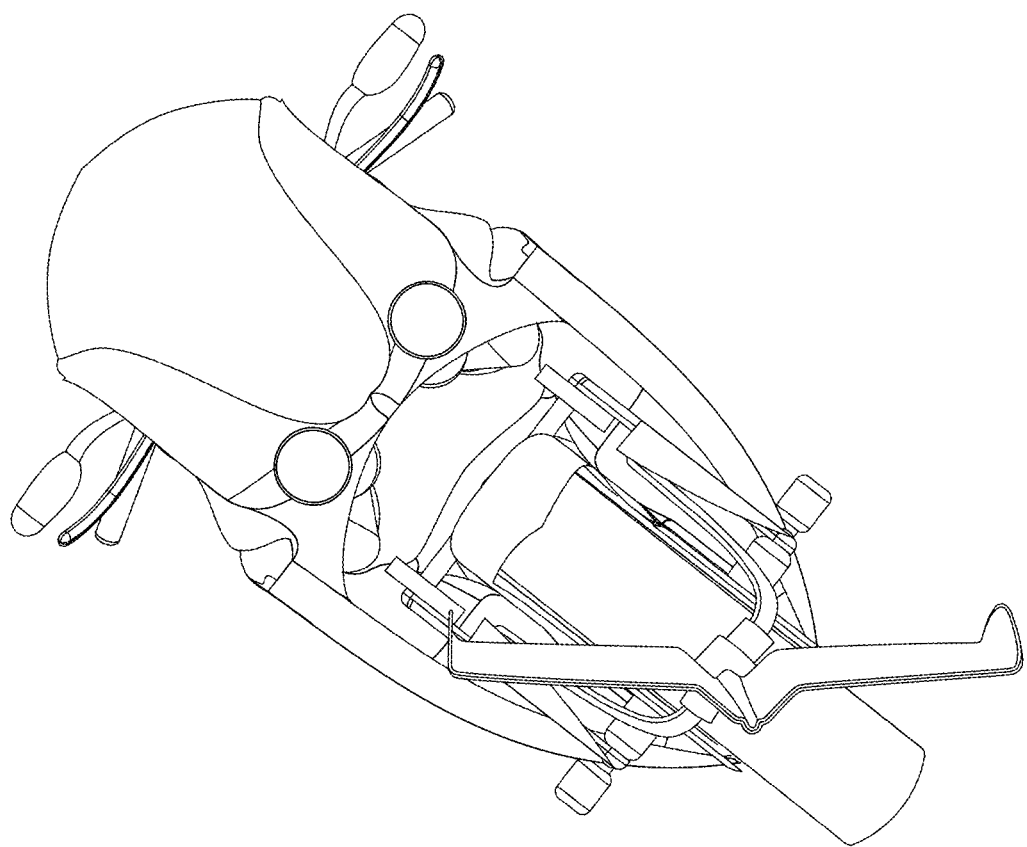
FIG. 7 is a view of the downforce generating front wing of FIG. 6, in accordance with a non-limiting example.

Reference will now follow to FIGS. 6 and 7, wherein like reference numbers represent corresponding parts in the respective views, in describing a downforce generating system 212 in accordance with another non-limiting example. In contrast to downforce generating system 60, which is an active system, downforce generating system 212 is a passive system, e.g., does not include externally driven components to adjust downforce.

Downforce generating system 212 includes a wing support 214 having a first member 216 and a second member 218 that extend forwardly and downwardly from front axle support member 26. Similar components (not separately labeled) are arranged on rear axle support member 30. First member 216 and second member 218 are joined by a connector 228. A downforce generating wing 235 is pivotally and rotationally mounted to connector 228. Downforce generating wing 234 includes a leading edge 236, a trailing edge 238, and an aerodynamic surface 240.

Wing support 214 positions downforce generating wing 235 outwardly of, and below, front axle mounting portion 28. In this manner, forces acting on aerodynamic surface 240 ensure that leading edge 236 remains substantially horizontal to support surface 42. As motorcycle 12 maneuvers, e.g., accelerates, brakes, rolls right and rolls left, downforce generating wing maintained the horizontal positioning of leading edge 236 relative to the support surface so as to ensure that downward forces are directed along a vector that is substantially perpendicular to support surface 42.

At this point, it should be understood that maintaining leading edge in a horizontal orientation relative to the support causes the downforce generating wing (front and or rear) to impart forces on front axle support member 26 and/or rear axle support member 30 to enhance traction components for front wheel and tire 38 and rear wheel and tire 40. By directing the energy through unsprung components of the vehicle, the downward force is applied with minimal losses. Further, by maintaining the downward force along a vector that is substantially perpendicular to the supporting surface, vehicle traction and, by extension, vehicle performance may be enhanced.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic)

described in connection with the aspect is included in at least one aspect described herein, and may or may not be present in other aspects. In addition, it is to be understood that the described elements may be combined in any suitable manner in the various aspects.

The terms "about" and/or "substantially" is/are intended to include the degree of error associated with measurement of the particular quantity based upon the equipment available at the time of filing the application. For example, "about" and/or "substantially" can include a range of +8% of a given value.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A vehicle comprising:
   a frame configured to pivot relative to a support surface through both positive and negative roll angles;
   a wheel support coupled to the frame, the wheel support including an axle mounting portion;
   an axle defining an axis of rotation mounted to the wheel support at the axle mounting portion;
   a downforce generating system mounted to the wheel support between the frame and the axle mounting portion, the downforce generating system including:
   a wing support mounted to the wheel support; and
   a downforce generating wing pivotally mounted to the wing support, the downforce generating wing including an aerodynamic surface having a leading edge, the downforce generating system being configured to maintain a substantially horizontal orientation of the leading edge relative to the support surface as the frame pivots between the positive and the negative roll angles.

2. The vehicle according to claim 1, wherein the wing support is mounted to the wheel support at the axle mounting portion.

3. The vehicle according to claim 2, further comprising a rotational motor mounted to the wing support and connected to the downforce generating wing, the rotational motor defining a rotational axis for the downforce generating wing.

4. The vehicle according to claim 3, wherein the rotational motor is coupled to a motor support connected to the wing support through a hinge, the hinge defining a pivot axis for the downforce generating wing.

5. The vehicle according to claim 4, further comprising a wing controller operatively connected to the rotational motor, the wing controller being operable to selectively rotate the downforce generating wing to maintain a substantially constant horizontal orientation of the downforce generating wing relative to the support surface.

6. The vehicle according to claim 5, further comprising at least one of a lean angle sensor, a throttle sensor, and a brake pressure sensor, the wing controller being operable to selectively activate the rotational motor to maintain the substantially constant horizontal orientation of the downforce generating wing relative to the support surface based on inputs from the one of the lean angle sensor, the throttle sensor, and the brake pressure sensor.

7. The vehicle according to claim 5, further comprising:
a motor support connected to the wing support; and
a hinge connecting the motor support to the wing support, the hinge defining a pivot axis for the downforce generating wing, wherein the rotational motor is coupled to the motor support.

8. The vehicle according to claim 7, further comprising a linear actuator mounted to one of the motor support and the wing support, the linear actuator being connected to the wing controller.

9. The vehicle according to claim 8, wherein the wing controller is selectively operable to control the linear actuator to selectively shift the downforce generating wing about the pivot axis.

10. The vehicle according to claim 2, wherein the downforce generating wing is positioned between the support surface and the axle mounting portion.

11. The vehicle according to claim 1, further comprising a suspension component arranged between the frame and the wheel support.

12. The vehicle according to claim 11, wherein the wheel support comprises one of a front fork component and a swingarm.

13. A downforce generating system mountable to a wheel support between a frame and an axle mounting portion of a two wheeled vehicle comprising:
a wing support; and
a downforce generating wing pivotally mounted to the wing support, the downforce generating wing including an aerodynamic surface having a leading edge, the downforce generating system being configured to maintain a substantially horizontal orientation of the leading edge relative to a support surface as the frame pivots between the positive and the negative roll angles.

14. The vehicle according to claim 11, wherein the suspension component comprises each of a front fork component and a swingarm.

15. A method of creating downforce on a wheel of a vehicle comprising:
detecting an orientation parameter of the vehicle
activating a rotational motor connected to a downforce generating wing mounted to a wheel support;
rotating the downforce generating wing about a pivot axis defined by the rotational motor; and
maintaining a substantially horizontal orientation of the downforce generating wing relative to a support surface with the rotational motor through changes in roll angle.

16. The method of claim 15, wherein detecting changes in orientation includes sensing changes in vehicle roll angle, the substantially horizontal orientation of the downforce generating wing being maintained through the changes in vehicle roll angle.

17. The method of claim 16, wherein maintaining the substantially horizontal orientation of the downforce generating wing includes providing signals from one of a lean angle sensor, a throttle sensor, and a brake sensor to a downforce generating wing controller.

18. The method of claim 16, further comprising pivoting the downforce generating wing about a pivot axis that is substantially perpendicular relative to the pivot axis.

19. The method of claim 15, wherein maintaining the substantially horizontal orientation of the downforce generating wing includes generating a substantially constant downward force on the wheel support, the substantially constant downward force being directed along a downward force axis that is substantially perpendicular relative to the support surface.

20. The method of claim 19, wherein generating the substantially constant downward force on the wheel support includes applying the generating a substantially constant downward force on an unsprung portion of the wheel support.

\* \* \* \* \*